United States Patent Office 3,437,183
Patented Apr. 8, 1969

3,437,183
CLUTCH AND COUPLING WITH COOLING DEVICE
Jean Maurice, Paris, France, assignor to Societe Anonyme Francaise du Ferodo, Paris, France, a corporation of France
Filed May 29, 1967, Ser. No. 641,892
Claims priority, application France, June 3, 1966, 64,077
Int. Cl. F16d *37/00, 13/60, 13/72*
U.S. Cl. 192—3.33    8 Claims

ABSTRACT OF THE DISCLOSURE

Hydraulic transmissions having, in the same bell casing filled with oil, a hydraulic coupling apparatus (torque converter or hydraulic turbo-coupling), a clutch and an external heat exchanger. The oil under pressure circulating in the bell casing passes through the heat exchanger only when the clutch is engaged.

---

The present invention relates to hydraulic transmission systems, particularly for automobile vehicles, and of the kind having a rotatable bell casing filled with oil and connected to a driving shaft for rotation therewith, a hydraulic coupling device (torque converter or hydraulic turbo-coupling) having an impeller fixed to the bell casing, a turbine adapted to be driven in rotation by the impeller under the action of the oil, and two clutch plates in piston/cylinder relationship coupled for rotation with the turbine and adapted to grip or release a friction disc coupled for rotation with a driven shaft, the bell casing being divided into two oil chambers of which one is outside and the other within the two plates, in combination with a source of oil under pressure, as, for example, an oil pump, and distribution means sensitive to the operating conditions of a control device, such as a gear-box or reversing device, and selectively directing the oil under pressure towards one or the other of the chambers for engaging or disengaging the clutch. The oil under pressure circulating in the bell casing is passed through an external heat exchanger in well known manner.

This arrangement is particularly suitable in the cases in which it is not possible by reasons of its axial bulk, to provide the torque converter or hydraulic turbo-coupling with external ventilating blades. However, this arrangement is subject to excessive pressure loss, particularly in the case in which the volume of oil under pressure is common to the torque converter or hydraulic turbo-coupling and to a gearbox, and by reason of the large volume of oil to be displaced during declutching, the latter operation is often subject to a time lag between actuating the clutch control and actual disengagement of the clutch.

An object of the present invention is to provide various arrangements in which pressure losses particularly during declutching are minimised.

The transmission according to the invention is characterized in that the oil under pressure circulating in the bell casing is only allowed to pass to an external heat exchanger when the clutch is engaged.

To this end, the distribution means include a cylinder in which slides a control valve which is sensitive to the operating conditions of the control device, and into which discharge to either side of a central duct connected to the pressure source, two other ducts connected respectively to the oil chambers external and internal to the clutch plates, the control valve having two bearing portions one at either side of the central duct or placing the latter in communication with one or the other of the other ducts according to the position of the valve, and that duct which is connected to the oil chamber within the clutch plates discharges into the cylinder in a zone of the latter to which is connected an oil circuit which passes through the external heat exchanger before returning to the main housing of the assembly.

Thus, only the oil which passes through the torque converter or hydraulic coupling passes into the exchanger, and this reduces considerably the pressure losses, the oil circulation in the exchanger being interrupted during declutching; the latter thus takes place with greater rapidity.

Preferably, the cooling fluid of the motor is used as the fluid in the exchanger, particularly when the motor is provided with a regulating device such as a thermostat, disengageable fan or the like, this arrangement enabling the oil to be maintained at substantially constant temperature. Moreover, on starting up, the working temperature of the assembly is attained more rapidly.

The driven shaft has, in known manner, an internal axial passage forming a portion of the ducts associated with the distribution means.

In accordance with the invention, and in order to further lessen pressure losses, the axial passage of the driven shaft is connected to the corresponding duct of the distribution means by passages formed obliquely in the said shaft at the end of the axial passage, and preferably the axis of each of these oblique passages meets the circle along which the axial passage meets the usual machining cone forming the end of this passage.

The characteristics and advantages of the invention will more fully appear from the following description given by way of example with reference to the accompanying drawings in which.

Figure 1:
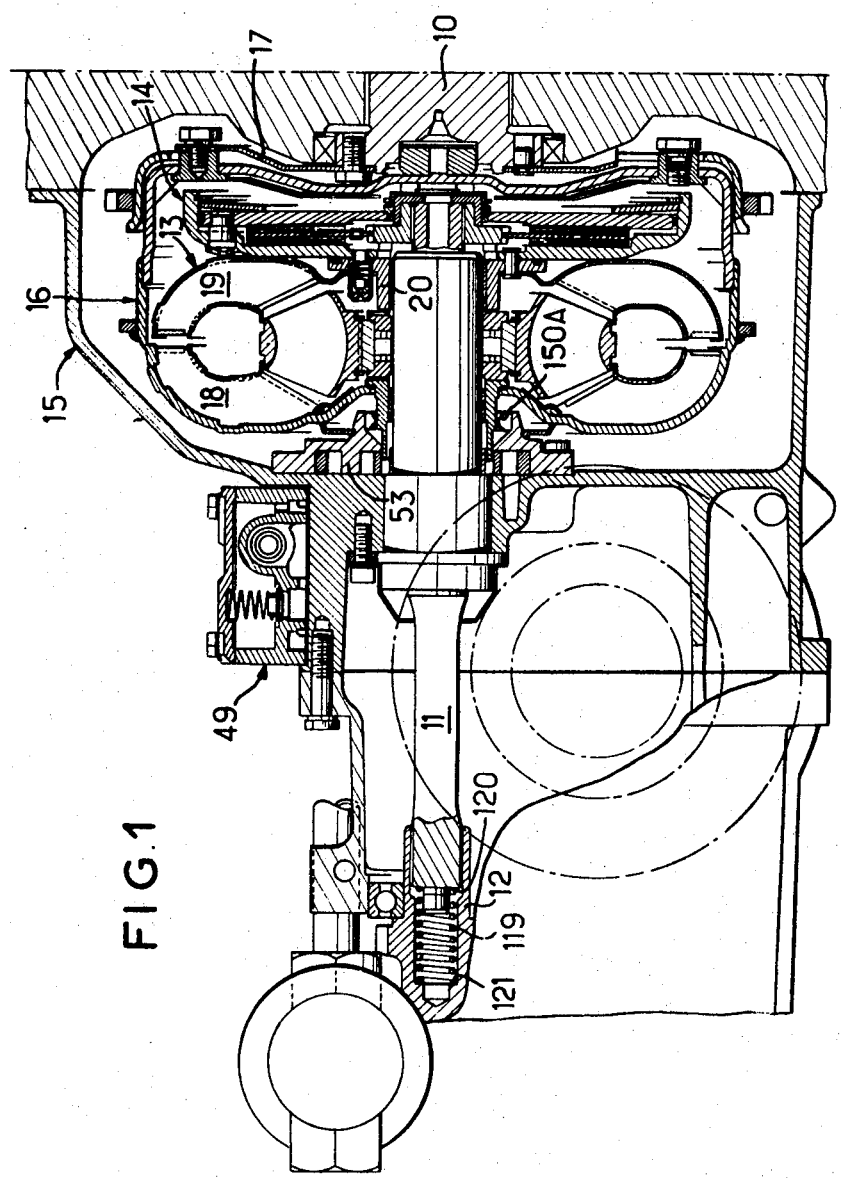
FIG. 1 is a view of a hydraulic transmission of the invention in longitudinal section along the line I—I of FIG. 2, certain of the ducts having been omitted.

Referring to the embodiment shown in the drawings, which is an application of the invention to the hydraulic transmission of an automobile vehicle, FIG. 1 shows, at 10, the driving shaft of the transmission and at 11 the driven shaft which is engaged on the splines of the primary shaft 12 of a gearbox and/or an inversion device (not shown) which couples the shaft 12 to the shaft 11.

The transmission comprises a hydraulic coupling device 13, and a clutch 14. The device 13 is shown in the form of a hydraulic torque converter but can equally well be a hydraulic turbo-coupling.

A fixed outer housing 15 is located between the housings of the engine and gearbox. Within this housing 15 is disposed a bell-casing 16 which is filled with oil and which contains the converter 13 and the clutch 14.

Figure 3:
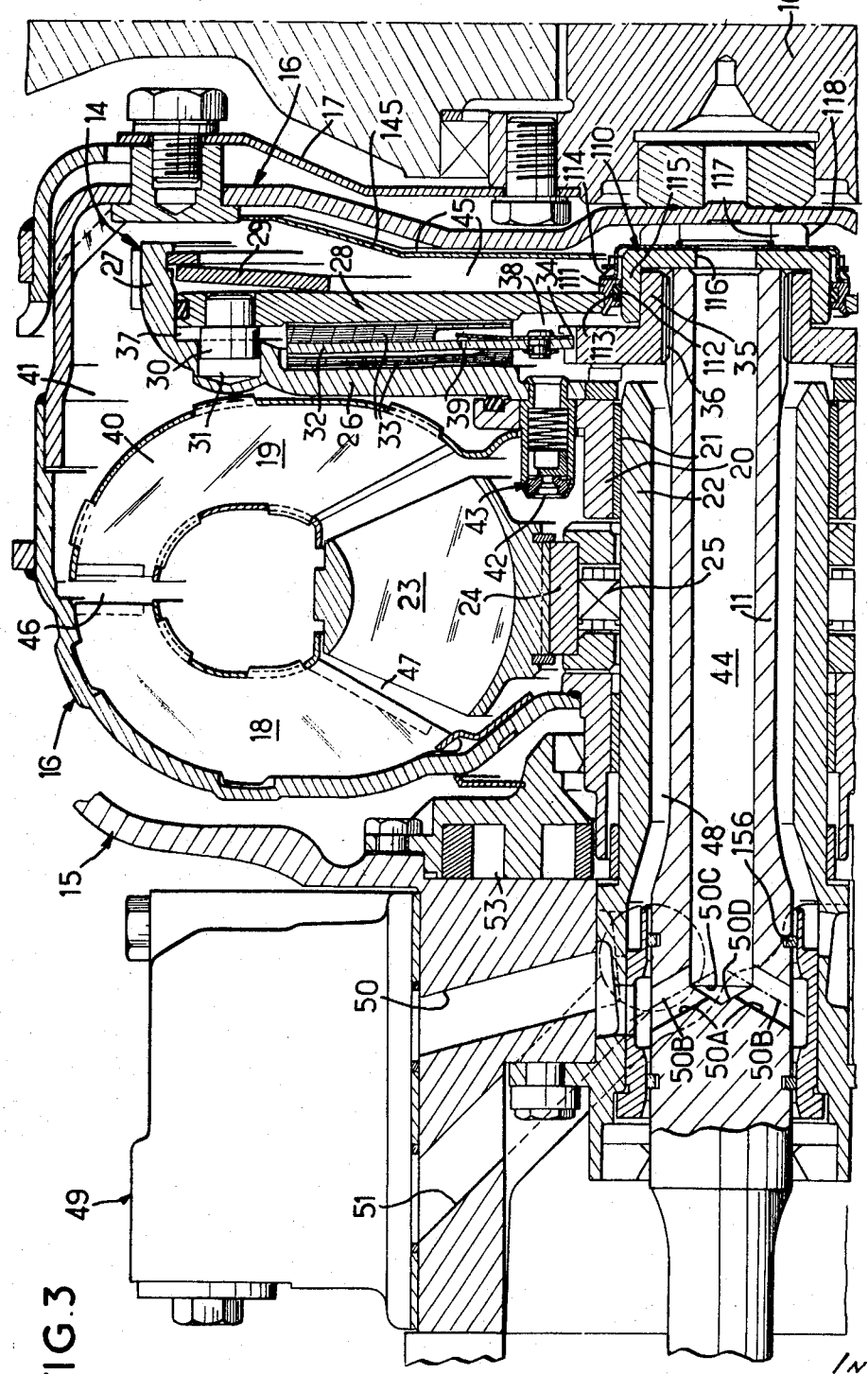
FIG. 3 is a similar view to that of FIG. 1 and shows, on a larger scale, only a part of the transmission.

To the driving shaft 10 is coupled, by a flexible plate 17, the bell-casing 16, to which is rigidly connected the impeller 18 of the converter 13. The turbine 19 of the converter is rigid with a part 20 which turns on a bearing about a fixed sleeve 22 (FIG. 3). The latter is rigid with the housing 15 and surrounds the driven shaft 11. The reactor 23 of the converter is coupled to a part 24 which is prevented from turning in the sense opposite to the rotation of the engine by a unidirectional coupling as for example a free wheel 25, with the sleeve 22.

The part 20 is rigidly secured by rivets (not shown) to the central portion of the plate 26 of the clutch 14. This clutch is adapted to couple or decouple the turbine 19 with the shaft 11.

In a peripheral cylindrical portion 27 of the plate 26 is engaged a plate in the form of a piston 28 urged towards the plate 26 by a simple Belleville washer 29.

The plate 28 is secured fast for rotation with the plate 26 by means of several studs 30 engaged in blind holes formed in the plate 26. This arrangement enables the plate 28 to be made in a hard material so that there is no permanent deformation of this plate; however, such a material is generally too hard to enable the studs to be made by simply pressing them from the plate 28.

A friction disc 32 having friction linings 33 on its two faces is disposed between the plates 26 and 28 and adapted to be gripped by them. It is mounted on splines 34 formed around a hub 35 itself mounted in splines on the shaft 11, which couples the disc 32 for rotation with this shaft.

Around the periphery of the clutch disc 32 and between the plates 26 and 28 of the clutch is formed a chamber 37 of variable volume containing oil, whilst in the space surrounded by the linings 33 and lying between the plates 26 and 28 is a chamber 38 containing oil. The peripheral chamber 37 communicates with the chamber 38 by at least one suitable passage 39 provided, for example, in the disc 32 and the linings 33.

The bell-casing 16 filled with oil under pressure is thus divided into two chambers of which one is outside the plates 26 and 28 of the clutch 14 and includes the work circuit 40 of the converter 13, and a space 41 surrounding the plates 26 and 28 and disposed beside the converter 13. The other chamber is inside the plates 26 and 28 and is formed by the two chambers 37 and 38. The two chambers 40, 41 and 37, 38 communicate with each other only by means of calibrated orifices 42 which are arranged in the part 20 and provided with calibrated non-return valves 43 which permit circulation in the direction 40, 38, but prevent all circulation in the reverse direction.

Figure 4:
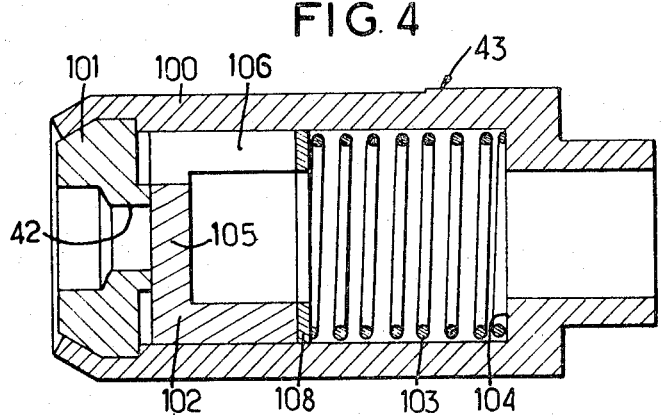
FIG. 4 is a view in longitudinal section of a unidirectional calibrated valve used in the transmission of the invention.
Figure 5:
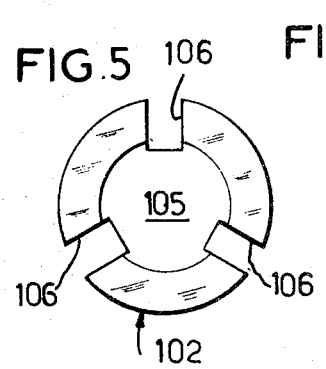
FIG. 5 is an end view of one of the elements of the valve of FIG. 4.

Each valve 43 forms an independent preassembled unit and comprises (FIGS. 4 to 6) an external cylinder 100, a valve seat 101 inserted at one end of the cylinder 100 and having a calibrated orifice 42 therethrough and a valve member movable in the cylinder 100 and urged towards its seat 101 by a helicoidal spring 103 which bears against a shoulder 104 of the cylinder 100.

Figure 6:
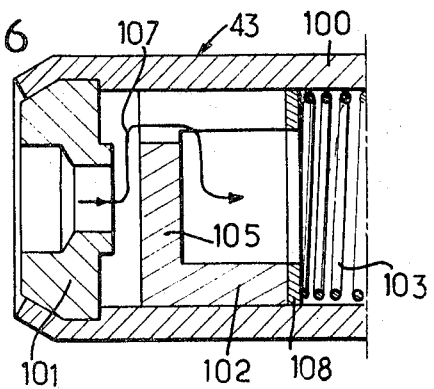
FIG. 6 is a part sectional view similar to FIG. 4 showing the operation of the valve.

The movable valve member is shown in the form of a cylinder closed by a bottom 105 adapted to be applied against the orifice 42, and is provided with lateral slots 106, with three slots 106 for example, for the passage of oil in the direction of the arrow 107 in FIG. 6 when it is displaced from the seat 101.

To provide a bearing surface for the spring 103, a washer 108 is interposed between this spring and the end face of the valve cylinder 102.

The chamber 41 is fed with oil under pressure from a drilling 44 of the shaft 11 through a space 45 between the clutch 14 and the bell-casing 16, the passage running along either side of a plate 145 and a collar 110 ensuring sealing between this space 45 and the internal volume 38 within the clutch plates 26, 28 in the manner to be described hereinafter. In its central zone, the plate 28 carries a separate ring which is held in place by being gripped between the collar 110 and the plate 28. This ring 111 has a groove 112 which houses a toroidal sealing joint 113, and also has radial notches 114.

The sealing collar 110, has, in the embodiment described, a cylindrical skirt 115 frictionally engaged between the hub 35 of the friction disc 32 and the ring 111. The collar 110 has an axial drilling 116 leading through diametric grooves 117 provided in an extension 118. For sealing between the passage 44 and the chamber 38, the shaft 11 bears against the collar 110 itself in contact with the wall of the bell-casing 16; the shaft 11 is urged against the collar by a spring 119, FIG. 1, disposed at the other end of the shaft 11 between a shoulder 120 of the latter and a further shoulder 121 of the shaft 12 in the end of which the shaft 11 is engaged. Communication between the passage 44 and the space 45 is ensured by the bore 116 and the transverse grooves 117 of the collar 110.

The work circuit 40 of the converter 13 is fed with oil from the chamber 41 through the peripheral space 46 between the impeller 18 and turbine 19.

The oil leaves the work circuit 40 through the space 47 between the turbine 19 and reactor 23 and passes into the chamber 38 through the valves 43. This chamber 38 communicates with a space 48 between the shaft 11 and the sleeve 22.

Figure 2:
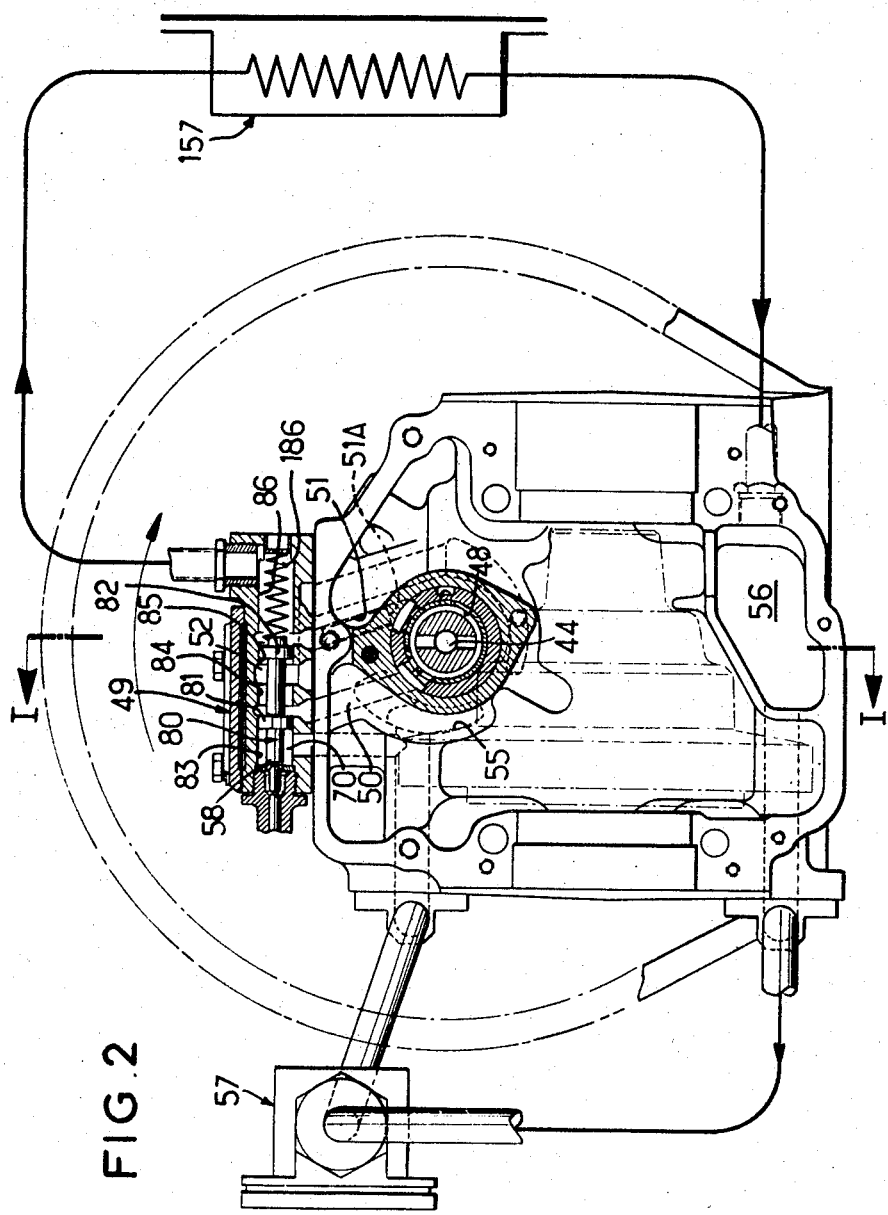
FIG. 2 is a transverse sectional view of this transmission.

The bore 44 is connected to distribution means 49 by a duct 50 and passages 50A, which are advantageously inclined to the axis of the shaft 10 and opening into the end of the bore 44 the axes 50B of the passages 50A meeting the circular base 50C of the machining cone 50D which forms the end of the bore 44 in the usual manner; this arrangement enables a diminution in pressure losses to be obtained. The space 48 is connected to the distribution means 49 by another duct 51. The distribution means 49 are fed with oil under pressure by a duct 52 which is connected to an oil pump 53 (FIGS. 1 and 2). The pump 53 is, in the example described, disposed adjacent to the impeller 18 and driven by the latter.

The intake 55 of the pump is connected to a chamber 70 of a distribution means (FIG. 2) and also to chamber 56 through a filter 57. This chamber 56 is formed in the fixed housing 15 which may or may not communicate with the gearbox housing. In the present case the filter 57 retains impurities which may possibly cause wear in the elements of the gearbox.

In the embodiment shown, the axis of the distribution means 49 is horizontal and orthogonal to the axis of the apparatus. The distribution means 49 comprises a slide-valve 80 having two bearing portions 81 and 82. The portion 81 cooperates with two bores 83 and 84. The portion 82 also cooperates with two bores 85 and 86; the bore 86 communicates with the chamber 56 through an external heat exchanger 157 of which the second or cooling fluid is preferably, but not necessarily taken from the usual cooling fluid of the engine (not shown).

At its end 58, the slide valve 80 is responsive to control means, which may be hydraulic or electromagnetic (not shown) actuated by the gearbox or inversion device control against the action of opposing elastic means 186.

In the position shown in FIG. 2 the bearing portions 81 and 82 are respectively in the bores 83 and 85. The pump output duct 52 and the duct 50 communicate with each other as do also the duct 51 and the bore 86.

As long as the gearbox remains engaged, and not in neutral, the slide valve is in the position shown in FIG. 2. As has just been shown, the pump output duct 52 of the pump 53 is in communication with the duct 50. The oil under pressure flowing from the duct 52 to the duct 51 reaches the drilling 44 (FIG. 3) and flows into the space 41, the work circuit 40, and afterwards through the orifices 42 having the valves 43, and in doing so undergoing a considerable loss in pressure. The oil returns to the bore 86 of the distribution means 49 by the following paths 38, 48, 51, 86. As the pressure in the chamber 41 is greater than the pressure in the chambers 37, 38, by reason of the aforesaid fall in pressure, the clutch remains engaged.

From the bore 86, the oil returns to the chamber 56, after passing through the exchanger 157 where it is conveniently cooled.

If a gear change is selected, or if the gear lever is in the neutral position, the slide valve 80 of the distribution means is caused to slide by its associated hydraulic control means: the output duct 52 of the pump 53 is caused to communicate with the conduit 51. The oil under pressure in 52, 51 instead of being directed to the exchanger 157, feeds directly the space 48 and the chamber 38, and afterwards the chamber 37. The valves 43 close and by reason of their particular construction close very precisely whatever the speed of rotation of the transmission. The work circuit 40 and the chamber 41 are caused to communicate with the intake 55 of the pump by the following paths 54, 44, 50, 83, 55. The pressure in the chambers 37, 38 exceeds the pressure in the chamber 41. The clutch 14 is disengaged.

It should be noted that, in this case, the exchanger 157 is out of circuit, and this avoids the most serious leaks during such a declutching operation. This arrangement ensures a very rapid declutching which is important both in the case of manual control (there is no sensation of lag due to a delay in the declutching operation), and in the case of an automatic gear change control in which it is essential that the declutching precedes the change of gear ratio.

A filter 51A may advantageously be provided in the duct 51 from the internal clutch chamber 38. The filter 51 protects the slide valve 80 from material possibly resulting from wear of the lining.

What I claim is:

1. A hydraulic transmission comprising a rotatable bell-casing filled with oil, and connected to a driving shaft for rotation therewith, a hydraulic coupling device having an impeller fixed to the bell-casing, a turbine adapted to be driven in rotation by the impeller under the action of the oil, and two clutch plates in piston/cylinder relationship coupled for rotation with the turbine and adapted to grip or release a friction disc coupled for rotation with a driven shaft, the bell-casing being divided into two oil chambers of which one is outside and the other within the two plates, in combination with a source of oil under pressure, circulation ducts for the oil, of which at least one passes serially through an external heat exchanger and through a supply chamber, and distribution means sensitive to the operating conditions of a gearbox, and selectively directing the oil under pressure through the said ducts, towards one or the other of the chambers for engaging or disengaging the clutch, the oil under pressure circulating in the bell-casing being allowed to pass through the heat exchanger only when the clutch is engaged.

2. A transmission according to claim 1 characterized in that the distribution means include a cylinder in which slides a control valve which is sensitive to the operating conditions of the control device, and into which discharge to either side of a central duct connected to the pressure source, two other ducts connected respectively to the oil chambers external and internal to the clutch plate, the control valve having two bearing portions one at either side of the central duct for placing the latter in communication with one or the other of the other ducts according to the position of the valve, and that duct which is connected to the oil chamber within the clutch plates discharges into the cylinder in a zone of the latter to which is connected an oil circuit which passes through the external heat exchanger.

3. A transmission according to claim 1, characterized in that the secondary fluid circulating in the heat exchanger for cooling the oil coming from the converter is taken from the usual engine coolant, and is controlled by the coolant thermostat when fitted.

4. A transmission according to claim 1, characterised in that a filter is incorporated in the pump intake.

5. A transmission according to claim 1, characterised in that the two external and internal oil chambers of the clutch plates communicate with each other only by calibrated orifices provided with calibrated unidirectional valves of large dimensions, and each comprising a first cylinder, a valve seat in the cylinder, a second cylinder sliding within the first, the second cylinder having an end applied against the said valve seat, and having also axial slots, and being urged towards the valve seat by resilient means bearing on an internal shoulder of the first cylinder.

6. A transmission according to claim 5, characterised in that the resilient means is a helicoidal spring, a thrust washer being interposed between this spring and the corresponding annular portion of the second cylinder.

7. A transmission according to claim 2, characterised in that the driven shaft has an axial passage forming part of the said ducts, the axial passage being connected to the distribution means by bores formed obliquely in the driven shaft and opening into the end of the passage.

8. A transmission according to claim 7, said axial passage terminating in a conical end surface which intersects the side walls of said axial passage about a circle, the axis of each of the oblique bores intersecting said circle.

References Cited

UNITED STATES PATENTS

| 2,796,239 | 6/1957 | Holmes et al. | |
| 2,963,118 | 12/1960 | Booth et al. | |
| 3,235,043 | 2/1966 | Maurice et al. | 192—3.33 X |

FOREIGN PATENTS

| 955,066 | 4/1964 | Great Britain. |

BENJAMIN W. WYCHE III, *Primary Examiner.*

U.S. Cl. X.R.

137—540; 192—113